United States Patent [19]

Floch

[11] Patent Number: 5,476,717

[45] Date of Patent: Dec. 19, 1995

[54] MATERIAL HAVING ANTIREFLECTION, HYDROPHOBIC AND ABRASION RESISTANCE PROPERTIES AND PROCESS FOR DEPOSITING AN ANTIREFLECTION, HYDROPHOBIC AND ABRASION RESISTANT COATING ON A SUBSTRATE

[75] Inventor: Hervé Floch, Brunoy, France

[73] Assignee: Commissariat a L'Energie Atomique, Paris Cedex, France

[21] Appl. No.: 193,122

[22] PCT Filed: Aug. 21, 1992

[86] PCT No.: PCT/FR92/00814

§ 371 Date: Apr. 25, 1994

§ 102(e) Date: Apr. 25, 1994

[87] PCT Pub. No.: WO93/04386

PCT Pub. Date: Mar. 4, 1993

[30] Foreign Application Priority Data

Aug. 22, 1991 [FR] France .................... 91 10519

[51] Int. Cl.$^6$ .............. G02B 1/10; C03C 17/34; C03C 17/42

[52] U.S. Cl. .............. 428/421; 427/164; 427/165; 427/167; 427/169; 427/240; 427/407.1; 427/407.2; 428/422; 428/428; 428/429; 428/447; 428/448; 428/451

[58] Field of Search .................... 427/164, 165, 427/167, 169, 240, 407.1, 407.2; 428/421, 422, 428, 429, 447, 448, 451

[56] References Cited

U.S. PATENT DOCUMENTS 4,929,278  5/1990  Ashley et al. .................... 106/287.12

Primary Examiner—D. S. Nakarani
Attorney, Agent, or Firm—Oblon, Spivak, McClelland, Maier & Neustadt

[57] ABSTRACT

A material having antireflection properties, and a method of depositing an antireflection coating on a substrate, are disclosed. In order to obtain a coating having simultaneously antireflection, hydrophobic and abrasion resistance properties, a material is used comprising: an organic or inorganic substrate (2); an adhesion promoter layer (4) of a material selected from silanes; an antireflection coating (6) formed from colloids of silica in a siloxane binder; a coupling agent layer (8) of a material selected from silazanes; and an anti-abrasion layer (10) of a fluorinated polymer. These materials have specific applications in optics.

19 Claims, 2 Drawing Sheets

MATERIAL HAVING ANTIREFLECTION, HYDROPHOBIC AND ABRASION RESISTANCE PROPERTIES AND PROCESS FOR DEPOSITING AN ANTIREFLECTION, HYDROPHOBIC AND ABRASION RESISTANT COATING ON A SUBSTRATE

BACKGROUND OF THE INVENTION

1. Field of the Invention

The invention relates to a material having antireflection, hydrophobic and abrasion resistance properties. The invention also relates to a process for depositing an antireflection, hydrophobic and abrasion resistant deposit on an organic or inorganic substrate.

2. Discussion of the Background

Organic or inorganic substrates, i.e. in particular plastics or vitreous substrates, coated with an antireflection film have numerous applications. Substrates prepared in this way are of particular interest in the following fields: high power lasers, solar, thermal and photovoltaic applications, integrated optical systems or in architectural applications, such as external vitreous panels. In connection with solar applications, plastic or vitreous substrates are used in optical systems for minimizing heat losses, for concentrating and focussing light energy and finally for protecting certain absorbent elements. Compared with vitreous substrates, plastic substrates are less expensive, more easily modelled, lighter and less fragile in the case of shocks.

Numerous practical solutions have been proposed for the deposition of thin antireflection layers on substrates, but very few of them are appropriate for the treatment of plastics materials.

GB 1 444 152, GB 1 530 833 and U.S. Pat. No. 3,996,067 describe conventional methods for the deposition of antireflection layers on various plastics, namely vacuum evaporation, reactive plasma and fluorination processes. However, these procedures have never undergone significant industrial development, because they are onerous, lead to local overheating and therefore deformations and consequently only permit coating to take place on one face at once.

Most of the proposed solutions require the heating of the antireflection film at temperatures of around a few hundred degrees and sometimes at between 1000° and 1400° C. (cf. particularly U.S. Pat. No. 4,286,024), which are well above those which can be withstood by a plastics material (max thermal stability 150° C.).

U.S. Pat. No. 2,466,119 discloses a process for the preparation of reflecting films and/or antireflection multilayer products by hydrolysis and condensation of mixtures of titanium halides and/or silicon alkoxides. The porosity of these coatings is checked by varying the temperature. However, once again the obtaining of coatings having a good mechanical strength requires heating to temperatures well above those which can be withstood by conventional plastic.

U.S. Pat. No. 4,361,598 describes a process for the sol-gel deposition of a dense antireflection film based on $SiO_2/TiO_2$ on stainless steel or silicon cells. In order to convert the polymer into dense oxide, it is necessary to perform a heat treatment at between 300° and 600° C. Therefore this process cannot be applied to plastics materials. Moreover, the refractive index range covered by this patent varies between 1.4 and 2.4, whereas for obtaining a monolayer antireflection coating on a plastic substrate, it is necessary to have a refractive index of approximately 1.22.

U.S. Pat. No. 4,397,666 describes a process for the deposition of a thick sol-gel film containing several components by acting on the viscosity by adding an agent increasing the latter. The thickness of the film obtained varies between 0.3 and 1.0 micron and these thicknesses are much too great compared with the thickness of 0.123 micron specified by Fresnel equations, when it is wished to make a monolayer antireflection deposit on a plastics material.

U.S. patent application Ser. No. 7,148,458 (NTIS) (corresponding to U.S. Pat. Nos. 4,929,278 and 4,966,812) describes a process for depositing antireflection films on plastic substrates consisting of synthesizing an ethanol gel in the $SiO_2$-$B_2O_3$-$Al_2O_3$-$BaO$ system until a certain molecular complexity is obtained, followed by the reliquefying of the said gel mechanically breaking certain interpolymer bridges. This leads to a porous film having a low refractive index (approx. 1.23) at ambient temperature, which permits an adaptation to plastic substrates. However, this film only has a mediocre abrasion resistance.

Moreover, although in the solar sector, plastics such as polycarbonates, polyacrylates, polyallyl carbonates and the like are of particular interest, vitreous substrates are also interesting, particularly in the field of general optics. However, it is clear that due to the approximately 4% reflection losses for each air-glass interface encountered (the average index of glass being 1.5), the loss balance for a complex optical system is often excessive.

Therefore opticians have long sought to create antireflection films by the use of physical processes such as vacuum sputtering or evaporation. However, these processes are often sophisticated and expensive and generally inappropriate for the production of large, cheap batches.

U.S. Pat. Nos. 2,348,704, 2,486,431 and 2,490,662 deal with the preparation of antireflection films on certain glasses by extracting the component which is most easily solubilizable under the action of appropriate leaching agents. However, although these processes make it possible to lower the refractive index, they are limited to glasses having a very specific composition. In the same way, U.S. Pat. Nos. 4,019,884 and 4,086,074 describe processes based on the capacity of certain vitreous compositions to develop a phase separation when subject to thermal corrosion. However, these processes can only be developed on even more specific vitreous compositions than those used in the preceding patents.

Other processes, more particularly described in U.S. Pat. Nos. 4,273,826, 4,446,171 and 4,535,026 lead to the formation of antireflection films having a limited abrasion resistance and which can therefore be very easily damaged by wiping.

Finally, U.S. Pat. Nos. 2,432,484 and 4,271,210 disclose the possibility of using alumina or silica colloids for producing antireflection dielectric coatings, making it possible to increase the porosity of said coatings and therefore lower their refractive indices. Although these processes have the advantage of being usable at low temperatures, the colloidal coatings obtained have a very poor mechanical strength and are in particular sensitive to any physical contact.

SUMMARY OF THE INVENTION

Consequently the object of the invention is to obviate these disadvantages and bring about the deposition of an abrasion-resistant, antireflection coating on a non-specific, organic or inorganic substrate. Therefore the invention relates to a material having antireflection, hydrophobic and abrasion resisting properties.

According to the features of the invention, said material successively comprises:
- an organic or inorganic substrate,
- adhesion promoting coating produced in a material chosen from among silanes,
- an antireflection coating formed from silica colloids coated with a siloxane binder,
- a coupling agent coating produced in a material chosen from among silazanes, and
- an antiabrasive, fluorinated polymer coating.

The presence of the adhesion promoting coating makes it possible to actively reinforce the fixing of the antireflection coating to the substrate. Thus, there is a reduction of the direct reflection of treated substrates by increasing their transmission. The impregnation of the treated substrate with an antiabrasive, fluorinated polymer coating with a low refractive index, maintained by the coupling agent coating, makes it possible to retain the antireflection properties whilst increasing the abrasion resistance. The fluorinated polymer coating also gives the material its antiabrasive, antiadhesive and hydrophobic character.

The thus prepared antireflection coatings are homogeneous and free from cracking and/or internal cleaving planes. Consequently the film obtained is sufficiently elastic to accept possible torsions or deformations in the case where it is applied to a plastic substrate. Moreover, said antireflection film resists a humid, saline hot atmosphere and has a life which is of an appropriate nature when submerged in boiling water.

Preferably, the coupling agent coating is produced with hexamethyl disilazane and the antiabrasive coating is produced with a derivative of polytetrafluoroethylene (PTFE) (obtained by the polymerization of 2,2-bis-trifluoromethyl-4,5-difluoro-1,3-dioxole with tetrafluoroethylene), due to its good mechanical strength and hydrophobic properties.

Preferably, the antireflection coating comprises by weight between 70 and 75% silica colloids and between 25 and 30% siloxane binder. It is also possible to add to said antireflection coating a nonionic surfactant such as an alkyl phenoxypolyethoxyethanol, which increases the wettability of the substrate.

When the substrate is of an inorganic nature and in particular vitreous, the adhesion promoting coating is made from a material chosen from among epoxyalkoxy silanes.

When the substrate is of an organic nature and in particular plastic, the adhesion promoting coating is made from a material chosen from among γ-aminoalkylalkoxy silanes and epoxy-oxo-alkyl-alkoxy silanes.

The invention also relates to a process for the deposition of an antireflection, hydrophobic coating on an organic or inorganic substrate comprising:
a) applying to said substrate a coating of an adhesion promotor chosen from among silanes,
b) applying to the promotor coating, a sol-gel antireflection coating constituted by silica colloids coated with a siloxane binder,
c) performing a heat treatment so as to establish the siloxane bonds,
d) depositing on the antireflection coating, a coupling agent coating chosen from among silazanes,
e) depositing on the coupling agent coating a fluoropolymer antiabrasive coating,
f) performing a heat treatment so as to eliminate residual solvents.

Preferably, the depositions of the different coatings takes place by dip coating or centrifugal coating.

These methods use relatively unsophisticated and inexpensive industrial means. In addition, it makes it possible to treat relatively large surfaces and offers relatively interesting mass industrialization possibilities. This is advantageous compared with the prior art methods consisting of performing a vacuum evaporation treatment, because said procedures are very constraining from the operational standpoint and limitative with regards to the dimensions of the substrate to be treated. The process according to the invention makes it possible to use low viscosity, very pure treatment solutions, which spread very easily on the substrate to be treated.

The heat treatments are performed at a temperature between 110° and 120° C., i.e. at relatively low temperatures and which can be very easily withstood by the substrate, particularly when it is of plastic.

Finally and preferably, before performing the first adhesion promotor deposit on the substrate, a cleaning stage is performed, which consists of cleaning the substrate with an aqueous detergent solution, rinsing it with water and then with alcohol. When the substrate is of a vitreous nature, cleaning is improved by a controlled exposure under ultraviolet radiation and in the presence of ozone. This leads to a substrate with very hydrophilic faces.

BRIEF DESCRIPTION OF THE DRAWINGS

The invention is described in greater detail hereinafter relative to non-limitative embodiments and with reference to the attached drawings, wherein show.

DESCRIPTION OF EMBODIMENTS

Figure 1:
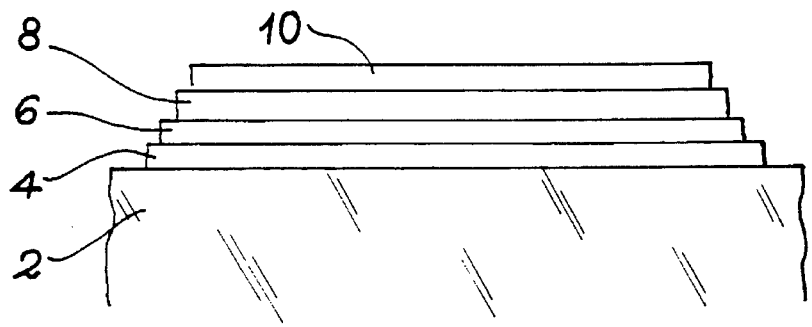
FIG. 1 A diagram illustrating the upper part of a material having antireflection and hydrophobic properties according to the invention.

FIG. 1 illustrates a material according to the invention. This material comprises an organic or inorganic substrate 2 covered with an adhesion promoting coating 4, an antireflection coating 6, a coupling agent coating 8 and finally an antiabrasive coating 10. FIG. 1 only shows one face of the material for simplification purposes, but in practice following treatment the two faces are covered with coatings 4, 6, 8 and 10.

Throughout the remainder of the description, the term organic substrate more specifically designates a plastic substrate, e.g. chosen from among polyacrylates, polycarbonates, polyallylcarbonates and polyamides. However, this list is not limitative and more generally covers polymer materials.

The term inorganic substrate more particularly covers a vitreous substrate, e.g. amorphous or even crystalline materials and in particular silica, borosilicate glasses, fluorophosphates and phosphates.

The antireflection coating 6 is prepared according to the sol-gel method standing for solution/gelatin. It is pointed out that a sol is a colloidal medium and that a gel is an elastic, viscous mass formed from solutions and colloidal suspensions and which has a solidified liquid structure. Conventionally, the antireflection coating 6 is obtained from a suspension of monodispersed silica colloids with a diameter of approximately 200 A coated with a soluble, polymeric siloxane binder. The colloids and the binder are synthesized from a molecular precursor. In the invention, the preferred precursor is tetraethyl orthosilicate. However, it is also possible to use tetramethyl orthosilicate or other silicon alkoxides.

In order to ensure a very good adhesion between the organic or inorganic substrate 2 and the antireflection coating 6, it is indispensable to deposit between them an adhesion promoting coating 4. According to the invention, said adhesion promotor is chosen from among the silanes. Among the latter, the epoxyalkoxy silanes are the most effective when the substrate is inorganic. However, when the substrate is organic, preference is given to the use of γ-amino-alkylalkoxy silanes and epoxy-oxo-alkyl-alkoxy silanes.

These silane-based compounds which are relatively easily hydrolyzable must be diluted in a dry and aprotic solvent before use. Preference is given to the use of anhydrous 1-butanol or tetrahydrofuran. However, it is also possible to choose other aliphatic alcohols or solvents, such as toluene, xylenes, hexane, acetonitrile or ethyl acetate, provided that there is a good chemical compatibility with the substrate to be treated.

Although the adhesion promoting coating 4 makes it possible to more adequately maintain the antireflection coating 6 on the substrate 2, this is not adequate and the antireflection coating 6 remains somewhat vulnerable to mechanical action. Consequently the invention also relates to the protection of the antireflection coating 6 by an antiabrasive coating 10 preferably formed from a fluorinated polymer. Thus, in the absence of the antiabrasive coating, the antireflection coating 6 remains porous (porosity approx. 48%) and is therefore mechanically more vulnerable than a dense film. Among the fluorinated polymers preference is given to a derivative of polytetrafluoroethylene (PTFE) known under the trade mark Teflon AF and marketed by du Pont de Nemours. This PTFE derivative, in addition to a low refractive index of 1.29, has the special feature of being soluble in certain perfluorinate compounds such as Fluorinert (registered trade mark) manufactured by the 3M company and which consequently for Teflon AF serves as a solvent.

However, before depositing this fluorinated polymer on the antireflection coating 6, it is important to prepare said coating with a specific coupling agent coating 8. Silazanes are the most appropriate compounds for the attachment of organic films. According to the invention, preference is given to the use of hexamethyl disilazane dissolved in tetrahydrofuran. However, it is also possible to use other silazane promotors or other aprotic or anhydrous solvents.

The invention also relates to the process for the preparation of the material according to the invention. This process consists of carrying out a cleaning stage with respect to the substrate 2. Therefore the substrate is very carefully cleaned with an aqueous detergent solution (e.g. containing deionized water, Titron-X 100 or Renex 690—registered trade marks). The substrate is then rinsed with deionized water and isopropyl alcohol filtered to 0.2 micron. When the substrate is inorganic, the cleaning will involve a supplementary stage of exposing said substrate to UV in the presence of ozone. The inorganic substrate is then very hydrophilic.

The following stage consists of applying to the substrate 2 the adhesion promoting coating chosen from among silazanes. This coating is uniformly applied to the substrate 2 either by dip coating, or by centrifugal coating at a speed between 1500 and 2000 r.p.m. The centrifugal deposition method is preferable, because it requires little treating solution. However, other deposition methods could also be used. This deposition type has the enormous advantage compared with the prior art of being able to coat relatively large surfaces. Thus, conventional vacuum evaporation treatment methods do not or only with great difficulty make it possible to treat such large surfaces.

This second stage is followed by a third consisting of applying to the promoting coating 4, the antireflection sol-gel coating 6 constituted, in conventional manner, by silica colloids coated with a siloxane binder. It is firstly necessary to prepare the sol-gel solution by hydrolyzing a precursor, e.g. tetraethyl orthosilicate, in a basic medium in order to obtain a colloidal silica suspension, which will then be neutralized. In parallel, the precursor is hyrolyzed in an acid medium so as to produce the soluble siloxane binder. In the present invention, the preferred binder concentration is approximately 25 to 30% by weight for 70 to 75% colloids. It has been found that this concentration range made it possible to obtain satisfactory antireflection functions, as well as a good mechanical strength. This film formed from colloids coated with a silica adhesive has an average refractive index of approximately 1.25 (measured by spectrophotometry). This value is satisfactory for producing an antireflection coating on an organic or inorganic substrate with an index close to 1.50. This antireflection coating 6 is also deposited by dip coating or centrifugal spreading.

Figure 2:
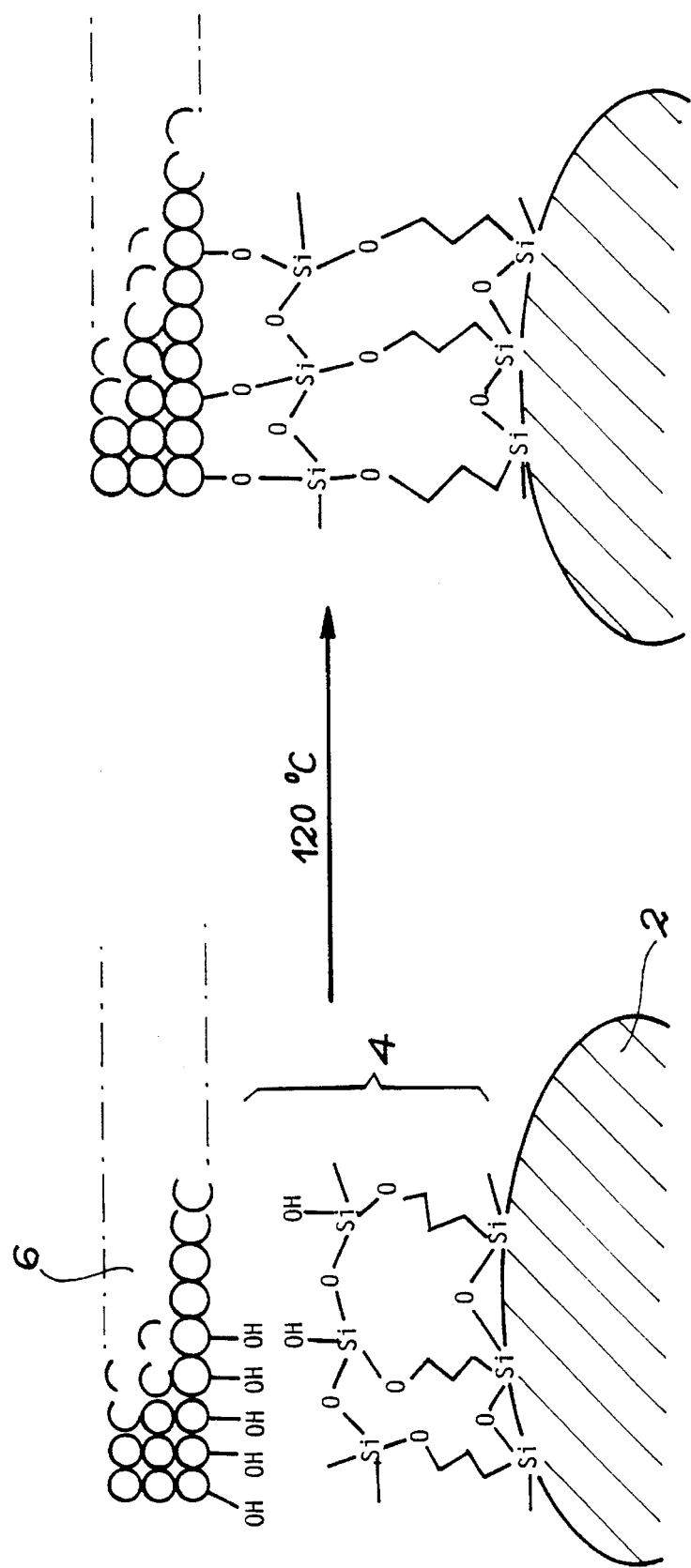
FIG. 2 A diagram showing a reaction stage and more specifically the formation of covalent bonds between the antireflection coating and the substrate.

As illustrated in FIG. 2, following the deposition of the antireflection coating 6, it is indispensable to carry out a heat treatment at about 110° to 120° C. in order to establish siloxane bridges between the adhesion promoting coating 4 and the antireflection coating 6. More specifically, the peripheral silanol groups are broken in order to create high-energy covalent bonds of the silicone type.

At this stage of the process a substrate 2 is obtained, whose two faces are covered with an antireflection coating 6 having a mean transmission of 99 to 99.5%. Cleaning with an ordinary cloth is possible without damaging the treated surface or surfaces. However, the antireflection coating is still fragile. It is therefore necessary to perform the following stages consisting of depositing a coupling agent coating 8 and then an antiabrasive coating 10. The coupling agent coating 8 is chosen from among silazanes. This coating 8 is deposited by dip coating or centrifugal spreading, as described hereinbefore in connection with the application of the adhesion promoting coating 4. It has been found that other deposition methods such as spraying or spreading with a roller gave mediocre results with respect to the effectiveness of the coupling.

The silazane coating 8 is then coated with a very dilute Teflon AF solution 10 (0.5 to 0.8 wt. %). This solution is filtered on a glass fibre layer. This is followed by a final heating stage at a temperature between 110° and 120° C., in order to evaporate the residual solvent.

It is also possible to increase the wettability of the substrate of the antireflection sol-gel solution 6 by adding to the latter a nonionic surfactant such as alkyl phenoxypolyethoxyethanol, particularly that known under the registered trade mark Triton-X manufactured by Rohm and Haas Corporation.

Hereinafter are given two examples for the production of multilayer materials according to the invention one produced with an organic substrate and the other with an inorganic substrate. The deposition operations are performed in a clean environment of minimum class 100 (US standard) and under a laminar air flow.

EXAMPLE 1

Use is made of an organic polyallyl carbonate substrate 2 with a diameter of 50 mm and a thickness of 2 mm, having a refractive index of 1.50 at a wavelength of 600 nm.

This substrate 2 was cleaned with a detergent mixture of 0.6 ml of Triton-X 100, 0.6 ml Renex 690, (registered trade marks) and 60 ml of pure deionized water. The substrate was then abundantly rinsed with deionized water and then isopropyl alcohol filtered to 0.2 micron.

1) A solution A was prepared by diluting to 4 wt. % 3-aminopropyl triethoxysilane in 1-butanol dried on a molecular sieve.

2) A solution B was prepared by mixing 2092.5 g of absolute ethanol with 273.42 g of distilled tetraethyl orthosilicate (167° C.; $10^5$ Pa). The mixture was homogenized by stirring for 5 minutes. This was followed by the slow addition of 72.6 g of rain 28% ammonia, whilst maintaining regular stirring. Hydrolysis was allowed to take place for 48 hours at 25° C. which gave a pH of approximately 10.5. The solution B became opalescent once the reaction was finished. The solution B obtained contains silica colloids with an approximate diameter of 20 nm. The colloidal sol was then made to flow back in order to eliminate the dissolved ammonia until a pH of approximately 5.5 was obtained. Such a mixture contains 3.3 wt. % silica.

3) A solution C of siloxane was prepared by mixing 232.5 g of absolute ethanol, 17.5 g of deionized water, 1.5 g of concentrated HCl and 17 g of distilled tetraethyl orthosilicate.

4) 350 g of solution B were mixed with all solution C in order to obtain a treating solution D. The latter was allowed to react for 48 hours. This gave a solution D containing in all 2.7 wt. % silica, whereof 70% are in colloidal form and 30% in the form of soluble polymers. This solution had a pH of approximately 1.5. Solution D was then filtered on glass fibres.

5) A solution E was prepared by diluting 3 wt. % hexamethyl disilazane in pure form in tetrahydrofuran.

6) A solution F was prepared by dissolving fluoropolymer AF 2400 (E. I. du Pont de Nemours) (registered trade mark) in a perfluorinated solvent Fluorinert FC-75 (3M registered trade mark). The weight concentration of Teflon AF was 0.075%.

7) On the cleaned substrate was firstly deposited 1 cm$^3$ of solution A at a rotation speed of 1800 r.p.m. It was allowed to dry for approximately 15 to 30 seconds, followed by the application at the same speed of 1 cm$^3$ of solution D. The substrate obtained was then heated at 120° C. for 30 minutes. Then, after cooling, deposition took place on the substrate of 1 cm$^3$ of solution E by centrifugal coating at 1800 r.p.m. Drying took place with air for 15 to 30 seconds, followed by the application of 1 cm$^3$ of solution F. The material obtained was then treated at 120° C. for 30 minutes.

It was spectrophotometrically established that the thus treated plastic substrate has the following transmission factors:

T=98.6% at λ=720 nm
T=99.1% at λ=620 nm
T=97.9% at λ=520 nm

These transmission values have an absolute error of ±0.5%.

EXAMPLE 2

Use was made of an inorganic silica substrate 2 with a diameter of 50 mm, a thickness of 8 mm and a refractive index of 1.46 at a wavelength of 600 nm.

This substrate 2 was cleaned with a detergent solution consisting of 0.6 ml of Triton-X 100, 0.6 ml of Renex 690 (registered trade marks) and 60 ml of pure deionized water. The substrate 2 was then abundantly rinsed with deionized water and then isopropyl alcohol filtered to 0.2 micron. The substrate was then placed in a UV/ozone photoreactor (of type PR 100, marketed by UVP Inc.) with $O_2/H_2O_2$ bubbling for a 5 minute cycle. This gave a substrate with very hydrophilic faces.

1) A solution A was prepared by diluting 4.5 wt. % of 3-gylcidoxypropyl triethoxysilane in 1-butanol dried on a molecular sieve.

2) A solution B was prepared by mixing 2092.5 g of absolute ethanol with 273.42 g of distilled tetraethyl orthosilicate (167° C.; $10^5$ Pa). The mixture was homogenized by stirring for 5 minutes. This was followed by the slow addition of 72.6 g of min 28% ammonia, whilst maintaining regular stirring. Hydrolysis took place for 48 hours at 25° C. and a pH of approximately 10.5 was obtained. It was found that this solution B became opalescent once the reaction was ended. The solution B obtained contains approximately diameter 20 nm silica colloids. The colloidal sol was then made to flow back in order to eliminate the dissolved ammonia, so as to obtain a pH of approximately 5.5. Such a mixture contains 3.3 wt. % silica.

3) A siloxane solution C was prepared by mixing 232.5 g of absolute ethanol, 17.5 g of deionized water, 1.5 g of concentrated HCl and 17 g of distilled tetraethyl orthosilicate.

4) 350 g of solution B were mixed with all solution C in order to obtain a treating solution D. The latter was allowed to react for 48 hours. This gave a solution D containing in all 2.7 wt. % silica, of which 70% were in colloidal form and 30% in the form of soluble polymers, said solution having a pH of approximately 1.5. Solution D was then filtered on glass fibres.

5) A solution E was prepared by diluting 3 wt. % hexamethyl disilazane in pure form in tetrahydrofuran.

6) A solution F was prepared by dissolving fluorpolymer AF 2400 (E. I. de Pont de Nemours—registered trade mark) in a perfluorinated solvent Fluorinert FC-75 (3M - registered trade mark). The weight concentration of Teflon AF was 0.075%.

7) On the cleaned substrate was firstly deposited 1 cm$^3$ of solution A at a rotation speed of 1800 r.p.m. It was allowed to dry for approximately 15 to 30 seconds, followed by the application at the same speed of 1 cm$^3$ of solution D. The substrate obtained was then heated at 120° C. for 30 minutes. Then, after cooling, deposition took place on the substrate of 1 cm$^3$ of solution E by centrifugal coating at 1800 r.p.m. Drying in air took place for 15 to 30 seconds, followed by the application of 1 cm$^3$ of solution F. Finally, the material obtained was treated at 120° C. for 30 minutes.

Figure 3:
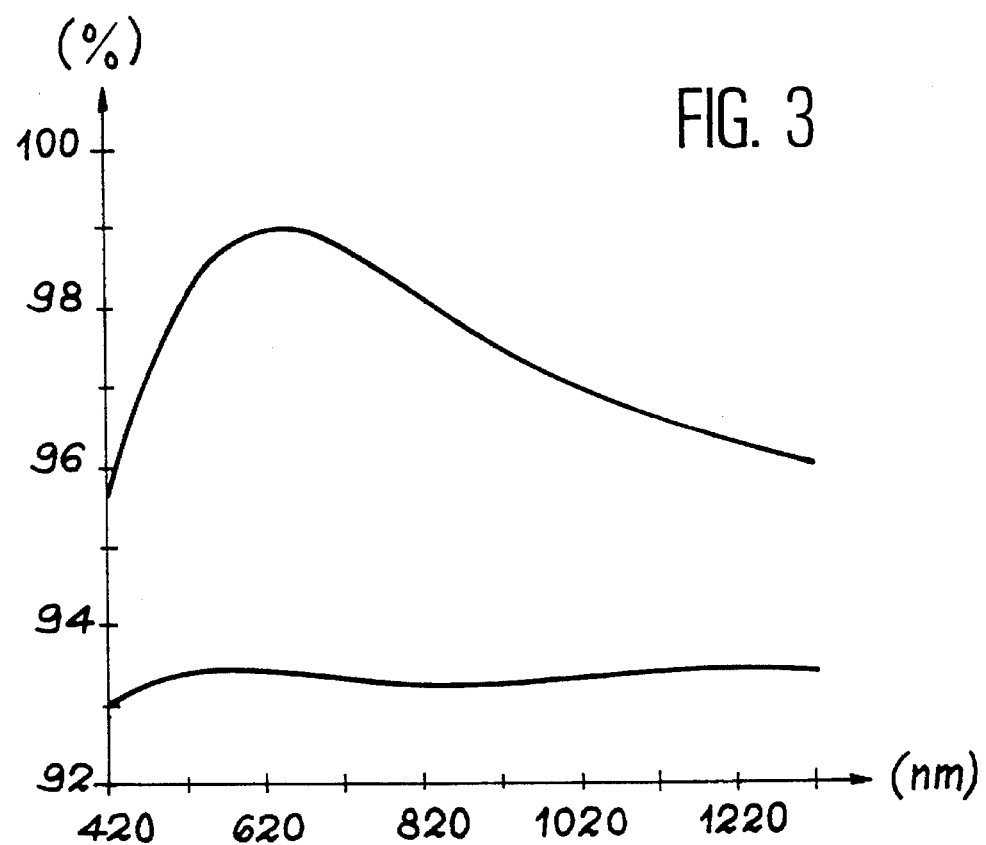
FIG. 3 The transmission percentage response of a borosilicate glass substrate with and without antireflection treatment on the two faces and at different wavelengths.

Spectrophotometrically it was revealed that the thus treated vitreous substrate had the following transmission factors (cf. FIG. 3):

T=98.7% at λ=720 nm

T 0 99.0% at λ=620 nm

T=98.2% at λ=520 nm

These transmission values have an absolute error of ±0.5%.

The curve in the bottom of the graph represents a comparative curve with an untreated substrate.

The materials according to the invention corresponding to the two preceding examples were tested with respect to their mechanical strength properties.

Test 1

After 10 drag wipe operations, i.e. using an ethanol-impregnated blotting paper engaged with the surface of the substrate and then pulled regularly, under a Reichert MEF 3×50 microscope no damage was observed.

Test 2

After 10 manual wiping operations with a soft cloth (cloth 4012 from International Clean Products Inc.), impregnated with ethanol, no damage was observed.

Test 3

After 10 manual wiping operations using the same cloth as in test 2, but in the dry state, no damage was observed.

Test 4

Following adhesion and tearing off of an adhesive tape of the Scotch Magic type (registered trade mark, gum produced by Scotch Inc.), no damage was observed.

Test 5

After 5 gumming cycles with a Mars-Plastic 52650 gum (registered trade mark, manufactured by Staedtler) with a Shore hardness of approximately 20, no damage was observed.

The climatic resistance properties of the materials of the two preceding examples were also tested. There was no wettability by salt water. Therefore the film is highly hydrophobic. Moreover, after leaving the substrate for 24 hours at 25° C. under a relative humidity of 96%, no damage was observed. Finally, a start of an attack on the material according to the invention was observed after spending 60 minutes in deionized water at boiling water and at a pressure of 1 atm ($10^5$ Pa). However, the antireflection power remained intact.

Finally, laser resistance tests were carried out. The damage threshold of the plastic substrates according to the invention is limited by the resistance of the substrate to laser action. On a plastics material substrate, the antireflection coating withstands energy densities of 7 to 8 $J/cm^2$ with a wavelength of 532 nm for 3 ns monopulses.

On a silica substrate, the antireflection coating withstands energy densities of 18 to 22 $J/cm^2$ and 45 to 50 $J/cm^2$ for pulse durations of 3 and 10 ns, at a wavelength of 1064 nm (near infrared). Therefore the damage threshold is 2 to 3 times higher than that of the prior art substrates.

Complimentary measurements performed at the shot rate (frequency 12 Hz) demonstrated that the materials according to the invention had a very good resistance to lasers. Tests were also carried out at a wavelength of 350 nm (ultraviolet) and reveled damage thresholds 3 to 5 times higher than conventional antireflection materials.

I claim:

1. Material having antireflection, hydrophobic and abrasion resistance properties, wherein it successively comprises:

an organic or inorganic substrate, an adhesion promoting coating made from a material selected from among silanes, an antireflection coating formed from silica colloids coated with a siloxane binder, a coupling agent coating formed from a material selected from among silazanes, and an antiabrasive coating of a fluorinated polymer.

2. The material according to claim 1, wherein the coupling agent coating comprises hexamethyl disilazane.

3. The material according to claim 1, wherein the antiabrasive coating is made from a derivative of polytetrafluoroethylene soluble in perfluorinate compounds.

4. The material according to claim 1, wherein the antireflection coating contains, by weight, between 70 and 75% silica colloids and between 25 and 30% siloxane binder.

5. The material according to claim 1, wherein the antireflection coating also contains a nonionic surfactant.

6. The material according to claim 5, wherein the nonionic surfactant is an alkyl phenoxypolyethoxyethanol.

7. The material according to claim 1, wherein the substrate is inorganic and the adhesion promoting coating is made from a material selected from among epoxyalkoxy silanes.

8. The material according to claim 1, wherein the substrate is organic and the adhesion promoting coating is made from a material selected from among γ-amino-alkyl-alkoxy silanes and epoxy-oxoalky-alkoxy silanes.

9. Process of making an article having antireflection, hydrophobic and abrasion resistance properties comprising:

a) applying to an organic or inorganic substrate a coating of an adhesion promotor selected from among silanes, b) applying to the promotor coating, a sol-gel antireflection coating constituted by silica colloids coated with a siloxane binder, c) performing a heat treatment so as to establish the siloxane bonds, d) depositing on the antireflection coating, a coupling agent coating selected from among silazanes, e) depositing on the coupling agent coating a fluoropolymer antiabrasive coating, f) performing a heat treatment so as to eliminate residual solvents.

10. The process according to claim 9, wherein the deposits of the different coatings are made by centrifugal coating.

11. The process according to claim 9, wherein the deposits of the different coatings are made by dip coating.

12. The process according to claim 9, wherein the heat treatments are performed at a temperature between 110° and 120° C.

13. The process according to claim 9, wherein the coupling agent coating comprises hexamethyl disilazane.

14. The process according to claim 9, wherein the substrate is organic.

15. The process according to claim 9, wherein the substrate is inorganic.

16. The process according to claim 14, wherein prior to the deposition of the adhesion promoting coating, a stage is performed which consists of cleaning the substrate with an aqueous detergent solution, rinsing it with water and rinsing it with alcohol.

17. The process according to claim 15, wherein prior to the deposition of the adhesion promoting coating, a stage is performed consisting of cleaning the substrate with an aqueous detergent solution, rinsing it with water, rinsing it with alcohol and exposing it to ultraviolet radiation in the presence of ozone.

18. The process according to claim 14, wherein the adhesion promoting coating is made from a material selected from among γ-amino-alkyl-alkoxy silanes and epoxy-oxo-alkylalkoxy silanes.

19. The process according to claim 15, wherein the adhesion promoting coating is made from a material selected from among epoxyalkoxy silanes.

* * * * *